US 6,640,177 B2

(12) United States Patent
Poljansek et al.

(10) Patent No.: US 6,640,177 B2
(45) Date of Patent: Oct. 28, 2003

(54) METHOD FOR DETERMINING A TRANSMISSION RATIO FOR AN AUTOMATIC TRANSMISSION ARRANGED IN A DRIVE TRAIN OF A MOTOR VEHICLE

(75) Inventors: Marko Poljansek, Reutlingen (DE); Rasmus Frei, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 27 days.

(21) Appl. No.: 09/750,685

(22) Filed: Jan. 2, 2001

(65) Prior Publication Data

US 2001/0007964 A1 Jul. 12, 2001

(30) Foreign Application Priority Data

Dec. 30, 1999 (DE) .......................... 199 63 749

(51) Int. Cl.$^7$ ................................. G06F 7/00
(52) U.S. Cl. ........................ 701/51; 477/46; 477/68; 477/174
(58) Field of Search .................. 701/51, 52; 192/31; 477/46, 68, 174

(56) References Cited

U.S. PATENT DOCUMENTS 5,014,839 A * 5/1991 Ohzono et al. ............... 477/39
6,080,083 A * 6/2000 Nishino ....................... 477/125

* cited by examiner

Primary Examiner—Gertrude Arthur
(74) Attorney, Agent, or Firm—Walter Ottesen

(57) ABSTRACT

The invention relates to a method for determining a transmission ratio for an automatic transmission arranged in the drive train of a motor vehicle. Operating parameters of the vehicle and especially of equipment arranged in the drive train are made available in a control apparatus to determine the transmission ratio. The invention provides that the transmission ratio (i) of the transmission is determined in dependence upon an instantaneous vehicle load.

19 Claims, 2 Drawing Sheets

US 6,640,177 B2

METHOD FOR DETERMINING A TRANSMISSION RATIO FOR AN AUTOMATIC TRANSMISSION ARRANGED IN A DRIVE TRAIN OF A MOTOR VEHICLE

BACKGROUND OF THE INVENTION

With the advanced automatization of equipment arranged in the drive train of motor vehicles, there is an increased necessity to provide a coordinated control thereof. For this purpose, operating parameters of the motor vehicle, especially of the equipment arranged in the drive train, are read into a control apparatus, evaluated and corresponding desired quantities are made available for the equipment. Automated equipment includes, for example, the following: a vehicle engine, a clutch or an automatic transmission. In the case of an automatic transmission, it has been shown to be especially difficult to adapt a wheel torque, which is applied to the vehicle wheels, to the actual requirements because an instantaneous vehicle load is not considered or is only considered inadequately in accordance with the conventional methods. The deficient consideration is based essentially on the difficulty to be able to determine with adequate accuracy the instantaneous vehicle load.

SUMMARY OF THE INVENTION

It is an object of the invention to provide a much more comfortable driving performance of the vehicle during the change of the transmission ratio. For example, a drop in torque is avoided at the start of uphill travel or with additional loading in that the transmission ratio of the transmission is set in dependence upon the instantaneous vehicle load.

The method of the invention is for determining a transmission ratio (i) for an automatic transmission mounted in the drive train of a motor vehicle. The method includes the steps of: providing a control apparatus wherein operating parameters of the motor vehicle are made available to determine the transmission ratio (i); and, determining the transmission ratio (i) of the automatic transmission in dependence upon an instantaneous load of the motor vehicle.

It has been shown to be especially advantageous to include the instantaneous vehicle load in a characteristic line for a throttle flap position. From the characteristic line, the required transmission ratio is then read out. The characteristic line, which is determined in this manner, can be corrected with the aid of suitable factors in an advantageous manner. In this way, a maximum acceleration can be ensured to the driver of the vehicle in each situation by depressing the accelerator pedal all the way down. To determine the instantaneous vehicle load, an uphill travel and a downhill travel, the additional loading and the total running resistance must be determined in order to determine from all of the above the transmission ratio to be selected. With the aid of the above-mentioned quantities, an acceleration of the vehicle can also be determined which is an index for the instantaneous vehicle load. The characteristic lines for the transmission ratio can therefore be set in dependence upon the acceleration.

In a preferred embodiment of the method, the acceleration in the form of a difference acceleration flows into the determination of the characteristic lines. The difference acceleration results from an expected and an actual acceleration. Advantageously, the expected acceleration is first averaged and thereafter normalized.

An especially exact prediction of the acceleration to be expected can be obtained with the aid of operating parameters such as a dynamic wheel radius, a transverse acceleration, a resulting wheel torque and a total running resistance torque. The total running resistance torque can be determined in dependence upon a vehicle speed from a characteristic line which is taken up for an unloaded vehicle in a plane; whereas, the resulting wheel torque is advantageously determined in dependence upon an output torque of a transmission output shaft, a rear axis ratio and a wheel rotation torque. The above-mentioned quantities can preferably be determined from a gradient of a wheel rpm, a mass inertia of the wheels, a number of the wheels, a converter amplification and an engine rotation torque. The above-mentioned procedures supply a value for the instantaneous vehicle load which comes especially close to the real value.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
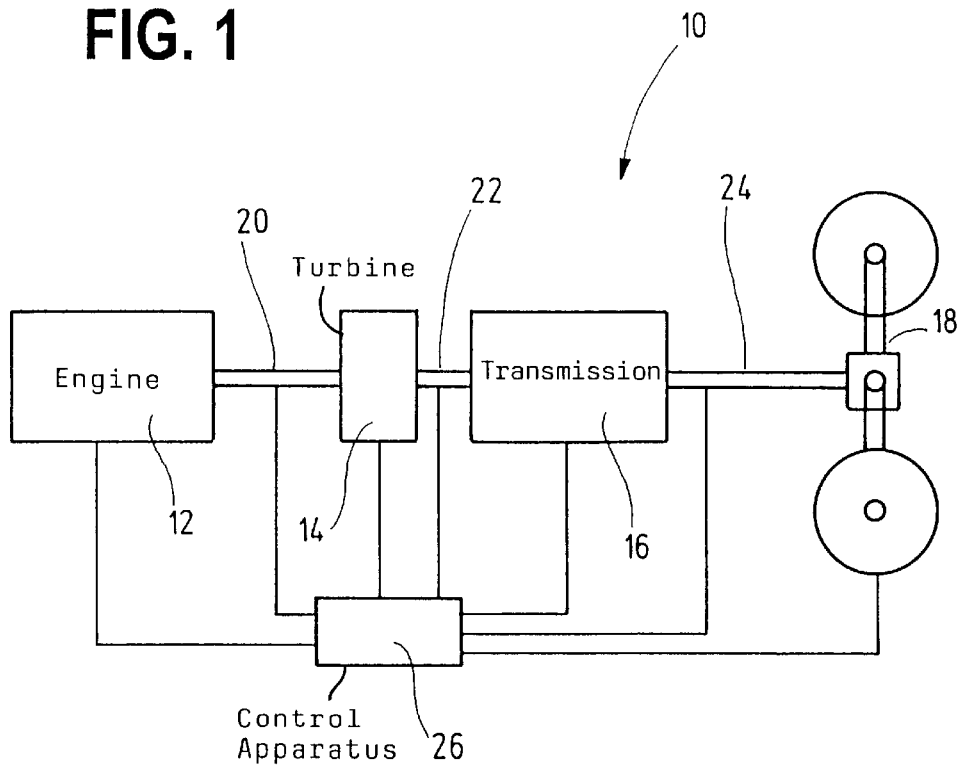
FIG. 1 is a schematic block diagram of the equipment arranged in the drive train of a motor vehicle.

FIG. 1 shows the equipment 10 essentially necessary to drive a motor vehicle. This equipment includes a vehicle engine 12, a torque converter or a clutch (characterized as turbine 14 hereinafter), a transmission 16 and a rear axle 18 having a differential and wheels. An engine torque $M_{mot}$ is transmitted from the engine 12 via an output shaft 20 to the turbine 14. In the turbine 14, the engine torque $M_{mot}$ is converted into a turbine torque $M_{tur}$ and is transmitted to a transmission input shaft 22. A transmission of an output torque $M_{ab}$ to a transmission output shaft 24 takes place in correspondence to a transmission ratio i within the transmission 16. The transmission output shaft 24 is operatively connected to the differential of the rear axle 18. In this way, a wheel torque $M_{wheel}$, which is needed to drive the motor vehicle, is present at the drive wheels.

The transmission 16 is an automatic transmission, an automated shift transmission (ASG) or a continuously variable transmission (CVT) whose transmission ratio i, which is to be adjusted, is determined in accordance with the method which follows. For this purpose, a control apparatus 26 is assigned to the individual components of the equipment 10 arranged in the drive train. By means of this control apparatus 26, operating parameters of the equipment 10 and of the vehicle can be determined and evaluated in a manner known per se. Subsequently, corresponding desired quantities for the operating parameters are pregiven to the equipment 10. The nature of the control of the individual pieces of equipment 10 via suitable drivers is known per se.

Figure 2:
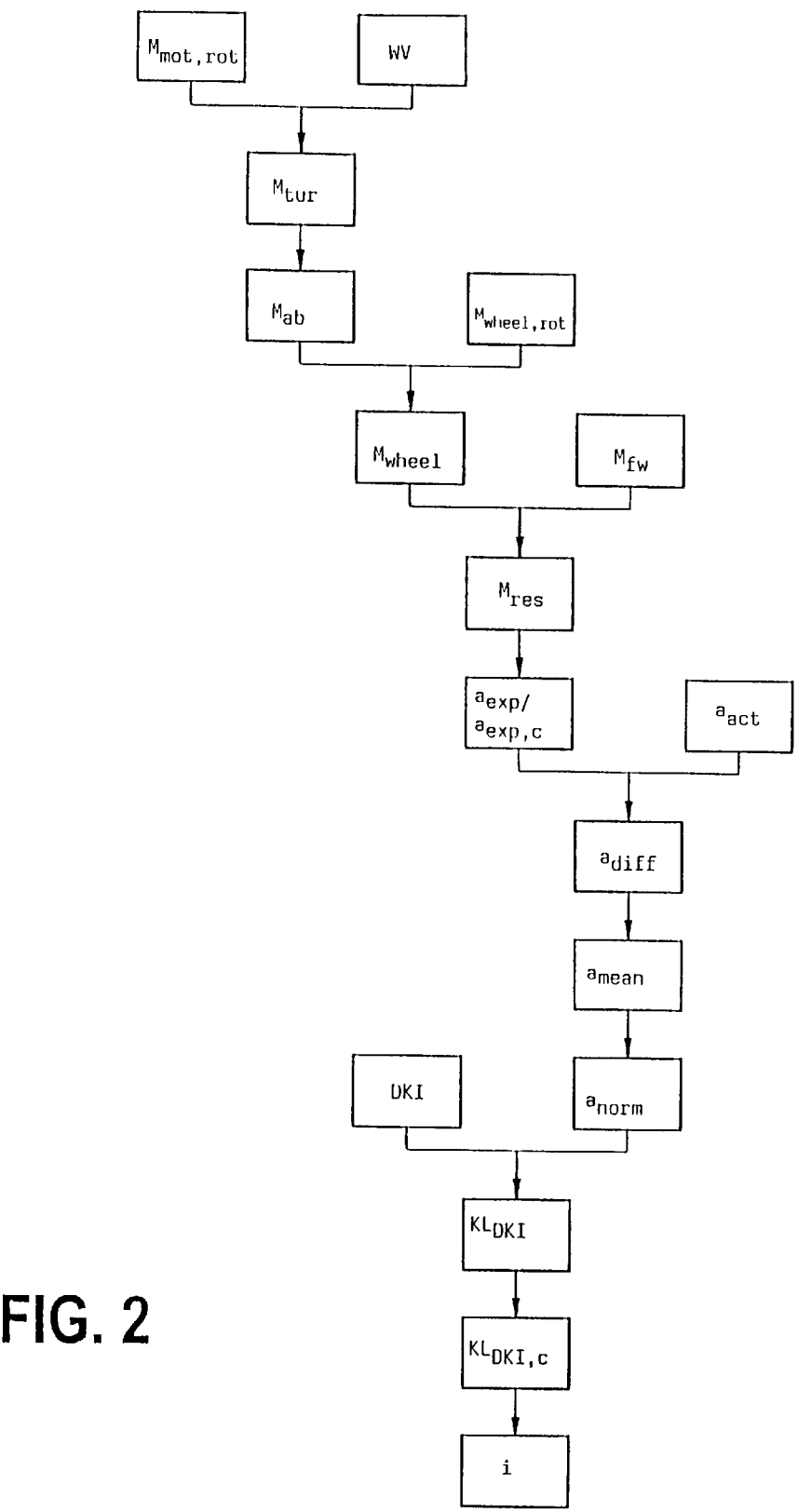
FIG. 2 is a flowchart for determining a transmission ratio.

An instantaneous vehicle load first has to be determined for transmitting the transmission ratio i of the transmission 16. In this connection, reference can be made to the flowchart of FIG. 2. It has been shown that an acceleration (a) of the vehicle is an index for the instantaneous vehicle load. The acceleration (a) is, in turn, dependent upon an expected acceleration $a_{exp}$. The expected acceleration $a_{exp}$ can be determined by means of a simplified vehicle model wherein mechanical and thermal losses as well as the rotation torque of the drive shafts and of the transmission 16 can be neglected. Furthermore, a power requirement of ancillary equipment, such as a generator or climate control system, are included in the load. The expected acceleration $a_{exp}$ is determined with the input quantities which are available to the control apparatus 26. The input quantities include: engine rpm $n_{mot}$, engine torque $M_{mot}$, turbine rpm $n_{tur}$, output rpm $n_{ab}$ and wheel rpm $n_{wheel}$. The expected acceleration $a_{exp}$ is determined in accordance with the following method:

First, an engine rotation torque $M_{mot,rot}$ is determined in accordance with a computation rule:

$$M_{mot,rot} = \frac{dn_{mot}}{dt} \cdot (J_{mot} + J_{tur}) \cdot 2\pi \tag{I}$$

wherein $dn_{mot}/dt$ is a gradient of the engine rpm $n_{mot}$ and $J_{mot}$ and $J_{tur}$ are mass moments of inertia of the vehicle engine 12 and the turbine 14. Furthermore, a converter amplification WV must be determined in accordance with the relationship:

$$WV = \frac{n_{mot}}{n_{tur}}. \tag{II}$$

Here, $n_{tur}$ is an rpm of the turbine 14. A turbine torque $M_{tur}$ can be computed with the aid of equations (I) and (II) via the relationship:

$$M_{tur} = WV \cdot (M_{mot} - M_{mot,rot}). \tag{III}$$

The equation (III) becomes simplified with a shift operation because then $M_{tur} = M_{mot}$. Thereafter, an output torque $M_{ab}$ can be determined in dependence upon an actual transmission ratio i of the transmission 16 via the relationship:

$$M_{ab} = M_{tur} \cdot i. \tag{IV}$$

Furthermore, it is necessary to determine a wheel rotation torque $M_{wheel,rot}$ from a gradient of the wheel rpm $n_{wheel}$, a mass moment of inertia $J_{wheel}$ of the wheels multiplied by the number (r) of the wheels in accordance with the relationship:

$$M_{wheel,rot} = \frac{dn_{wheel}}{dt} \cdot J_{wheel} \cdot r \cdot 2\pi. \tag{V}$$

From equations (IV) and (V), the resulting wheel torque $M_{wheel}$ can be determined while considering a rear axle transmission ratio $i_{hi}$ in accordance with the computation rule:

$$M_{wheel} = M_{ab} \cdot i_{hi} - M_{wheel,rot}. \tag{VI}$$

The influence of the total running resistance on the instantaneous vehicle load can be determined with the aid of a characteristic line $KL_{fw}$ in the form of a total running resistance torque $M_{fw}$. The characteristic line $KL_{fw}$ is recorded for an unloaded vehicle in the plane and defines an air resistance and a rolling resistance. The characteristic line $KL_{fw}$ is fixed in dependence upon a vehicle speed $V_{veh}$. A reserve torque $M_{res}$, which is available, is given from the resulting wheel torque $M_{wheel}$ and the total running resistance $M_{fw}$ by the computation rule:

$$M_{res} = M_{wheel} - M_{fw}. \tag{VII}$$

For a known vehicle mass $m_{veh}$ in the unloaded state and a known dynamic wheel radius $r_{dyn}$, the expected acceleration $a_{exp}$ results from the above as it would adjust in the plane:

$$a_{exp} = \frac{M_{res}}{m_{vec} \cdot r_{dyn}}. \tag{VIII}$$

When passing through a curve, the vehicle is additionally braked so that the expected longitudinal acceleration $a_{exp}$ is reduced. An index for the reduction is defined by a transverse acceleration $a_{tran}$ which can be measured directly or can be computed indirectly via the wheel rpms $n_{wheel}$. Finally, in this way, a corrected longitudinal acceleration $a_{exp,c}$, which is to be expected, can be determined via the relationship:

$$a_{exp,c} = a_{exp} - a_{tran}. \tag{IX}$$

The longitudinal acceleration $a_{exp,c}$, which is determined in this manner, is then compared to an actual acceleration $a_{act}$ and supplies a difference acceleration $a_{diff}$:

$$a_{diff} = a_{exp,c} - a_{act}. \tag{X}$$

The actual acceleration $a_{act}$ is obtained by differentiating the vehicle speed $V_{veh}$, that is, the already computed wheel rpm gradient and the dynamic wheel radius $r_{dyn}$.

It has been shown to be advantageous to first determine the difference acceleration $a_{diff}$ by means of a mean value filter over a pregiven time interval, for example, 1 second. The mean acceleration $a_{mean}$, which is determined in this way, is thereafter transferred into a unitless normalized acceleration $a_{norm}$ in that it is divided by a difference acceleration $a_{max}$, which represents a maximum load:

$$a_{norm} = \frac{a_{mean}}{a_{max}}. \tag{XI}$$

The normalized acceleration $a_{norm}$, which is determined in the manner shown above, serves to shift a characteristic line $KL_{DKI}$ for a throttle flap position DKI. From the characteristic line $KL_{DKI}$, the transmission ratio i, which is to be adjusted, can be read out.

Figure 3:
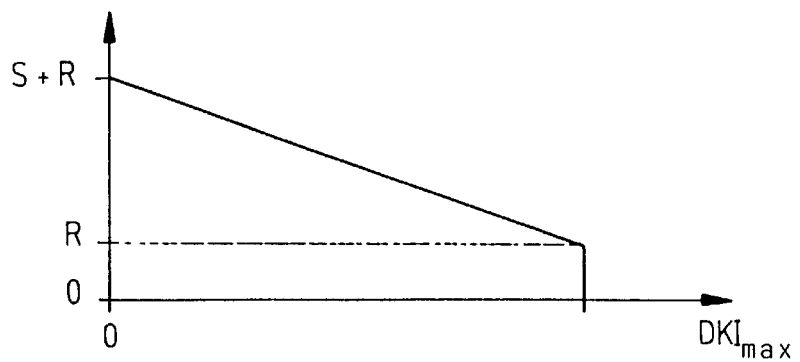
FIG. 3 is a trace of a corrected characteristic line for a throttle flap position.

In practice, it has been shown to be advantageous to fix the characteristic line $KL_{DKI}$ by means of throttle flap dependent factors, such as a spreading S and a residual factor R, via the relationship:

$$KL_{DKI,c} = \frac{KL_{DKI} \cdot ((S + R) \cdot DKI_{max} - S \cdot DKI)}{DKI_{max}} \tag{XII}$$

wherein $DKI_{max}$ is a maximum value of the throttle flap position DKI (see FIG. 3). In this way, the situation can be avoided that the characteristic lines $KL_{DKI}$ are less shifted in the region of small throttle flap values DKI than in the region of large throttle flap values DKI so that, in total, a maximum acceleration can be ensured to the driver of the vehicle when pressing down the accelerator pedal.

It is understood that the foregoing description is that of the preferred embodiments of the invention and that various changes and modifications may be made thereto without departing from the spirit and scope of the invention as defined in the appended claims.

What is claimed is:

1. A method of determining a transmission ratio (i) for an automatic transmission mounted in the drive train of a motor vehicle, the method comprising the steps of:
providing a control apparatus wherein operating parameters of the motor vehicle are made available to determine the transmission ratio (i);
determining the transmission ratio (i) of said automatic transmission in dependence upon an instantaneous load of said motor vehicle with said instantaneous load of said motor vehicle being included in a characteristic line ($KL_{DKI}$) for a throttle flap position (DKI); and,
determining the characteristic line ($KL_{DKI}$, $KL_{DKI,c}$) in dependence upon an acceleration (a) of said motor vehicle with said acceleration (a) being an index for the instantaneous load of said motor vehicle.

2. The method of claim 1, wherein: equipment including said automatic transmission are mounted in said drive train; and, operating parameters of said equipment are made available in said control apparatus to determine said transmission ratio (i).

3. A method of determining a transmission ratio (i) for an automatic transmission mounted as part of equipment in the drive train of a motor vehicle, the method comprising the steps of:
providing a control apparatus wherein operating parameters of the motor vehicle are made available to determine the transmission ratio (i);
making operating parameters of said equipment available in said control apparatus to determine said transmission ratio (i);
determining the transmission ratio (i) of said automatic transmission in dependence upon an instantaneous load of said motor vehicle with said instantaneous load of said vehicle being included in a characteristic line ($KL_{DKI}$) for a throttle flap position (DKI); and,
determining a corrected characteristic line ($KL_{DKI,c}$) for determining said transmission ratio (i) utilizing the computation rule:

$$KL_{DKI,c} = \frac{KL_{DKI} \cdot ((S+R) \cdot DKI_{max} - S \cdot DKI)}{DKI_{max}}$$

wherein:
S is a spread;
R is a residual factor; and,
$DKI_{max}$ is a maximum throttle flap position.

4. The method of claim 3, comprising the further step of determining the characteristic line ($KL_{DKI}$, $KL_{DKI,c}$) in dependence upon an acceleration (a) of said motor vehicle with said acceleration (a) being an index for the instantaneous load of said motor vehicle.

5. The method of claim 4, wherein said acceleration (a) is included in the form of a difference acceleration ($a_{diff}$) which is computed in accordance with the computation rule:

$$a_{diff} = a_{exp,c} - a_{act}$$

wherein:
$a_{exp,c}$ is a corrected expected acceleration; and,
$a_{act}$ is an actual acceleration.

6. The method of claim 5, wherein said expected acceleration ($a_{exp}$) is included in the form of a normalized acceleration ($a_{norm}$) which is computed in accordance with the computation rule:

$$a_{norm} = \frac{a_{mean}}{a_{max}}$$

wherein:
$a_{mean}$ is a mean value of the expected acceleration ($a_{exp}$); and,
$a_{max}$ is the difference acceleration ($a_{diff}$) under maximum load.

7. The method of claim 6, wherein the expected acceleration ($a_{exp}$) results from the computation rule:

$$a_{exp} = \frac{M_{res}}{m_{veh} \cdot r_{dyn}} - a_{tran}$$

wherein:
$M_{res}$ is a reserve torque;
$m_{veh}$ is the mass of said motor vehicle;
$r_{dyn}$ is a dynamic wheel radius; and,
$a_{tran}$ is a transverse acceleration.

8. The method of claim 7, wherein the reserve torque ($M_{res}$) is determined from the relationship:

$$M_{res} = M_{wheel} - M_{fw}$$

wherein:
$M_{wheel}$ is a resulting wheel torque; and,
$M_{fw}$ is the total running resistance torque.

9. The method of claim 8, wherein the total running resistance torque ($M_{fw}$) is determined in dependence upon a vehicle speed ($v_{veh}$) from a characteristic line ($KL_{fw}$) which, in turn, is determined in an unloaded vehicle in a plane.

10. The method of claim 9, wherein the resulting wheel torque ($M_{wheel}$) is determined from the relationship:

$$M_{wheel} = M_{ab} \cdot i_{hi} - M_{wheel,rot}$$

wherein:
$M_{ab}$ is the output torque;
$i_{hi}$ is a rear axle transmission ratio; and,
$M_{wheel,rot}$ is a wheel rotation torque.

11. The method of claim 9, wherein the wheel rotation torque ($M_{wheel,rot}$) is determined from the relationship:

$$M_{wheel,rot} = \frac{dn_{wheel}}{dt} \cdot J_{wheel} \cdot r \cdot 2\pi$$

wherein:
$dn_{wheel}/dt$ is a gradient of a wheel rpm ($n_{wheel}$);
$J_{wheel}$ is a mass moment of inertia of the wheels; and,
r is a number of wheels.

12. The method of claim 11, wherein the output torque ($M_{ab}$) is determined from the relationship:

$$M_{ab} = M_{tur} \cdot i$$

wherein:
$M_{tur}$ is a turbine torque; and,
i is the actual transmission ratio.

13. The method of claim 12, wherein the turbine torque ($M_{tur}$) is determined from the relationship:

$$M_{tur} = WV \cdot (M_{mot} - M_{mot,rot})$$

wherein:
WV is a converter amplification;
$M_{mot}$ is a motor torque; and,
$M_{mot,rot}$ is a motor rotation torque.

14. The method of claim 13, wherein the converter amplification (WV) is determined from the relationship:

$$WV = \frac{n_{mot}}{n_{tur}}$$

wherein:
$n_{mot}$ is a motor rpm; and,
$n_{tur}$ is a turbine rpm.

15. The method of claim 14, wherein the motor rotation torque ($M_{mot,rot}$) is determined from the relationship:

$$M_{mot,rot} = \frac{dn_{mot}}{dt} \cdot (J_{mot} + J_{tur}) \cdot 2\pi$$

wherein:
$dn_{mot}/dt$ is a gradient of the motor rpm;
$J_{mot}$ is a mass moment of inertia of the motor; and,
$J_{tur}$ is a mass moment of inertia of the turbine.

16. The method of claim 3, comprising the further step of determining the characteristic line ($KL_{DKI}$, $KL_{DKI,c}$) in dependence upon an acceleration (a) of said motor vehicle with said acceleration (a) being an index for the instantaneous load of said motor vehicle.

17. The method of claim 16, wherein said acceleration (a) is included in the form of a difference acceleration ($a_{diff}$) which is computed in accordance with the computation rule:

$$a_{diff} = a_{exp,c} - a_{act}$$

wherein:
$a_{exp,c}$ is a corrected expected acceleration; and,
$a_{act}$ is an actual acceleration.

18. The method of claim 17, wherein said expected acceleration ($a_{exp}$) is included in the form of a normalized acceleration ($a_{norm}$) which is computed in accordance with the computation rule:

$$a_{norm} = \frac{a_{mean}}{a_{max}}$$

wherein:
$a_{mean}$ is a mean value of the expected acceleration ($a_{exp}$); and,
$a_{max}$ is the difference acceleration ($a_{diff}$) under maximum load.

19. The method of claim 18, wherein the expected acceleration ($a_{exp}$) results from the computation rule:

$$a_{exp} = \frac{M_{res}}{m_{veh} \cdot r_{dyn}} - a_{tran}$$

wherein:
$M_{res}$ is a reserve torque;
$m_{veh}$ is the mass of said motor vehicle;
$r_{dyn}$ is a dynamic wheel radius; and,
$a_{tran}$ is a transverse acceleration.

* * * * *